United States Patent [19]
Den et al.

[11] Patent Number: 5,057,967
[45] Date of Patent: Oct. 15, 1991

[54] ROLLED FILM CAPACITOR

[75] Inventors: Minoru Den, Shiga; Hirokazu Sakaguchi, Kusatsu; Morihiko Hasebe, Omihachiman; Shigeyoshi Nishikawa, Shiga; Masayoshi Kakine, Kusatsu; Shusaku Tsujio, Otsu, all of Japan

[73] Assignee: Nichicon Corporation, Kyoto, Japan

[21] Appl. No.: 550,488

[22] Filed: Jul. 10, 1990

[30] Foreign Application Priority Data

Jul. 26, 1989 [JP] Japan .................................. 1-193000
Mar. 28, 1990 [JP] Japan .................................. 2-82596

[51] Int. Cl.⁵ .............................................. H01G 4/38
[52] U.S. Cl. .................................................. 361/328
[58] Field of Search ....................... 361/328, 329, 330; 29/25.42

[56] References Cited
U.S. PATENT DOCUMENTS 3,292,063 12/1966 Kellerman .......................... 361/328

FOREIGN PATENT DOCUMENTS 1-162318 6/1989 Japan .

*Primary Examiner*—Donald Griffin
*Attorney, Agent, or Firm*—Morris Fidelman; Franklin D. Wolffe

[57] ABSTRACT

A rolled film capacitor comprising a pair of dielectric film strips piled one upon another and wound into a roll, each strip having a metal electrode pattern deposited on one surface thereof, the pattern including a number of rectangular island electrodes mutually separated by a plurality of lateral and longitudinal insulating gaps and regularly arrayed in both directions, the island electrodes mutually overlapping to form a number of small capacitor elements which are connected in series in both directions by shifting both strips one from another in both directions. A plurality of such capacitors can be aggregated to form an improved large capacitive power supply device.

4 Claims, 2 Drawing Sheets

ROLLED FILM CAPACITOR

BACKGROUND OF THE INVENTION

This invention relates to a rolled film capacitor and, more particularly, to a capacitor formed by winding into a roll a pair of dielectric film strips such as paper strip or plastic film strip each having metallic electrodes deposited thereon.

An example of this type of capacitor is disclosed in the Japanese patent opening gazette No. H1-162318. In the capacitor of the cited reference, a suitable metal such as aluminium is evaporated onto a film strip of dielectric material such as polyethylene terephthalate to form a number of rectangular island electrode regions which are regularly arrayed in lateral and longitudinal directions. A pair of such strips are piled one upon another to form a number of capacitor elements and the strips are then laterally shifted one from another to serially connect the capacitor elements in the lateral direction for raising the breakdown voltage. The mutually overlapping strips are then wound into a roll to form a unit capacitor. A plurality of such unit capacitors are connected in series and/or parallel to form a capacitive power supply having necessary breakdown voltage and electrostatic capacitance.

Recent power supply devices of this kind are generally large in size and it has naturally been requested to reduce this size. Most of the volume of such unit capacitor is occupied by the dielectric material and, as well known in the art, a cumulative energy $J_c$ of such dielectric is given by an equation, $J_c = \epsilon E^2 V/2$, where $\epsilon$ is a dielectric constant, E is a field strength and V is the volume. Therefore, the cumulative energy per unit volume is proportional to square potential gradient. In other words, the most effective measure for reducing the size of capacitor is to increase the potential gradient of the dielectric.

Polyethylene terephthalate films and polypropylene films have generally been used as the dielectric material having high breakdown voltage. Although the breakdown voltage of these films is as high as 400 to 600 killovolts per millimeter, breakdown may happen when it is used in a capacitor and it has a large area and includes some partial defects, unless the design is effected with an allowable voltage lower than the lowest value of this breakdown voltage.

When a capacitor bank having large capacitance and large cumulative energy (e.g., one megajoule) is constructed, a number of unit capacitors are connected in parallel. If breakdown happens in one of the unit capacitors, the energies accumulated in the unit capacitors connected in parallel with it are concentrically discharged to the unit capacitor having broken down to cause an explosive destruction in danger of scattering its fragments and causing a fire.

In order to prevent these accidents, the unit capacitors have been designed with the potential gradient of the dielectric between 70 and 150 kilovolts per millimeter, which is lower than the actual breakdown voltage of the dielectric films by a factor of three to eight. This is the greatest cause of the large size of the capacitors.

Accordingly, an object of this invention is to remove from the capacitor function the fine defects regarding the breakdown voltage which are dispersed on the dielectric film and to construct the capacitor only with those parts of the film having ideal breakdown voltage, thereby increasing the potential gradient for use and reducing the size of the capacitors.

Another object of this invention is to significantly improve insulation recovering feature of the capacitors after breakdown in a defective portion of the film.

The above objects can be attained by a rolled film capacitor provided in accordance with this invention.

SUMMARY OF THE INVENTION

According to this invention, there is provided an improved rolled film capacitor comprising a pair of dielectric film strips each having a metal layer deposited on one surface thereof, both films being piled one upon another and wound into a roll. The metal layer is divided into a plurality of island electrodes which are mutually separated by a plurality of insulating gaps extending in the lateral and longitudinal directions and regularly arrayed in both directions. The island electrodes on both film strips face each other to form a plurality of capacitor elements. The overlapping strips are laterally and longitudinally shifted one from another to connect the capacitor elements in series in both lateral and longitudinal directions. The capacitor has first and second electrode terminals attached to both end faces of the roll, the first one being in contact with all the island electrodes lying along one side edge of one of the dielectric film strips which forms one of the end faces and the second one being in contact with the island electrodes lying along one side edge of the other dielectric film strip which forms the other end face.

These and other objects and features of this invention will be described in more detail below with reference to the accompanying drawings.

BRIEF DESCRIPTION OF THE DRAWINGS

In the drawings.

Throughout the drawings, same reference numerals and symbols are given to corresponding stuructural components.

DESCRIPTION OF PREFERRED EMBODIMENTS

Figure 1:
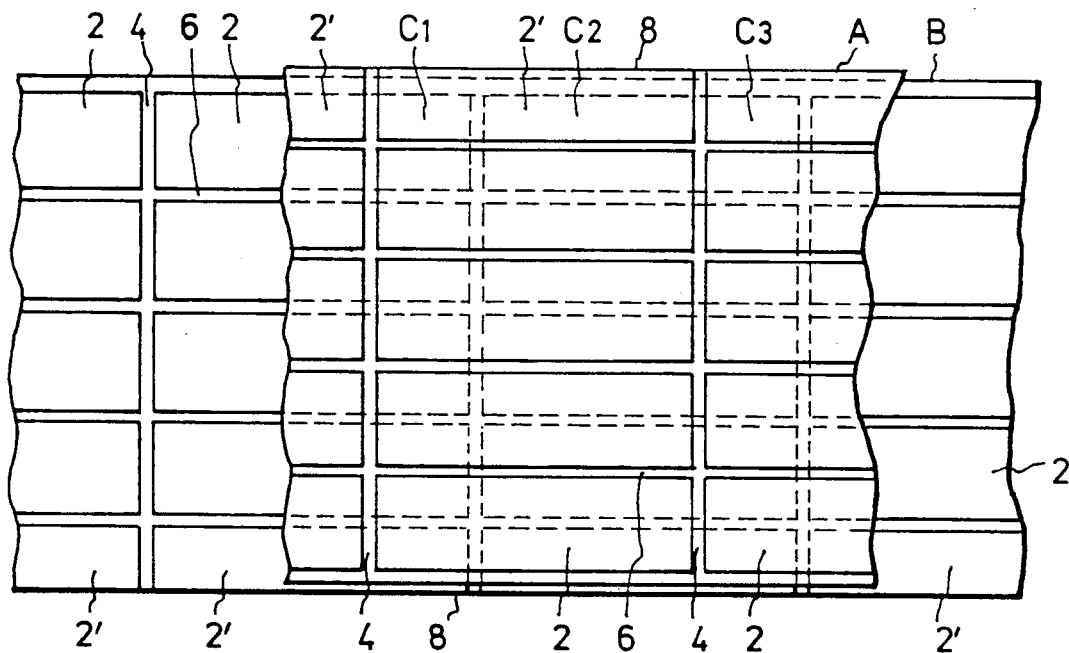
FIG. 1 is a partial plan view representing a pair of overlapping electrode film strips used in an embodiment of this invention.

FIG. 1 shows a pair of mutually overlapping film strips A and B made of dielectric material such as polyethylene terephthalate, polypropylene or the like. Each strip carries an electrode pattern including a plurality of rectangular metal electrode layers 2 which are mutually separated by a plurality of lateral and longitudinal insulating gaps 4 and 6 and regularly arrayed in both lateral and longitudinal directions. The eletrode layer islands 2 are deposited on one surface of each film strip using a suitable known technique such as vacuum evaporation of aluminium metal. As shown, those electrode layers 2' lying along one side edge 8 of each strip are laterally exposed from the edge for the purpose of contact with a terminal to be formed later. The electrode patterns on both dielectric film strips A and B are exactly identical and the strips are mutually rotated by 180 degrees, as found from the drawing.

The electrode layer islands 2 and 2' on the overlapping strips A and B form a plurality of capacitor elements therebetween as denoted by $C_1$, $C_2$, $C_3$ and so on. The strips A and B are mutually shifted together with their electrode patterns one from another in both lateral and longitudinal directions and this results in all capacitor elements connected in series in both directions.

Figure 2:
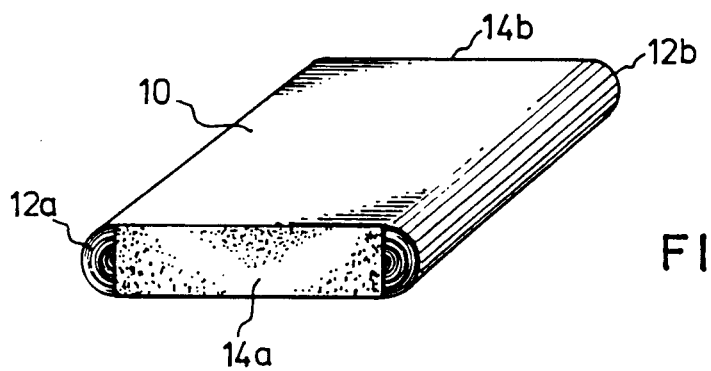
FIG. 2 is a perspective view representing a rolled film unit capacitor according to this invention.
Figure 3:
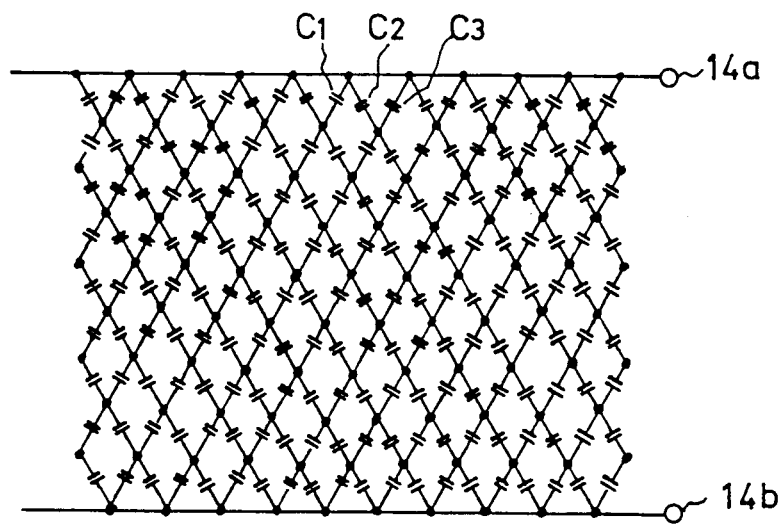
FIG. 3 is a partial equivalent circuit diagram of the unit capacitor according to this invention.

The overlapping film strips A and B are wound from one end thereof into a roll and the roll is then pressed into a flat roll 10 as shown in FIG. 2. The end faces 12a and 12b of the flat roll 10 are formed of one side edges 8 of the respective strips A and B from which the electrode layers 2' are exposed. Electrode terminal layers 14a and 14b are formed on the end faces 12a and 12b using a known suitable metalizing technique such as metal sputtering or flame spraying so that all edge electrode layers 2' on each strip are connected together in contact with each electrode terminal 14a or 14b to form a unit capacitor. Accordingly, the equivalent circuit of the resultant unit capacitor of FIG. 2 should be as shown in FIG. 3, in which a number of capacitor elements $C_1$, $C_2$, $C_3$, ... are connected in series and parallel between the terminals 14a and 14b to form a network as shown.

The capacitance of each capacitor element can be arbitrarily established by changing the intervals of the lateral and longitudinal insulating gaps 4 and 6. The capacitances of the adjoining capacitor elements such as $C_1$ and $C_2$ of FIG. 1 differ from each other and vary in accordance with the mutual deviation of the lateral insulating gaps on both strips A and B. If the deviation is fixed, the sum of both capacitances $C_1$ and $C_2$ is fixed and the sum of $C_2$ and $C_3$ is also fixed. This is also the case throughout the strips. According to another feature of this invention, the cumulative energy of both capacitor elements is selected to be one joule or less.

In view of the recent production engineering, suitable thickness of the dielectric film is about 4 to 9 micrometers in consideration of variance and uniformity of the thickness. If a voltage is applied to a film of such thickness to obtain a field stength of 300 kilovolts per millimeter, the voltage will be 1200 volts for the thickness of four micrometers and 2700 volts for nine micrometers. Application of such voltage to the overlapping films will result in breakdown even if a single defect exists within an area of several square meters. When there is no voltage drop between the films at that time due to large capacitance of the parallel capacitors or the external power supply, the material at the breakdown spot is evaporated and sputtered by discharge from the metal electrodes surrounding the same. In the prior art capacitor, however, due to the high voltage, no insulation is recovered and the discharge continues to result in damage of the whole capacitor.

In contrast, even if one of the capacitor elements, for example $C_1$, of the unit capacitor according to this invention has a defect and breakdown occurs to discharge all charge accumulated in the capacitor elements $C_1$ and $C_2$, the diameter of the resultant evaporated portion of the electrode layer 2 will not exceed about two millimeters and the breakdown will not spread beyond this portion, since the total cumulative energy of $C_1$ and $C_2$ is less than one joule. In the embodiment of FIGS. 1 and 3, the number of capacitor elements which are laterally connected in series is nine inclusive of the discharged element and, therefore, the voltage between both terminals 14a and 14b must be shared by the remaining eight serial elements. Thus, the voltage across the eight serial capacitor elements is $9/8 = 1.125$ times (i.e., 112.5% of) the rated voltage. On the other hand, the resultant potential gradient will be $300 \times 1.125 = 337.5$ kilovolts per millimeter which is lower than the aforementioned breakdown voltage of the dielectric film, 400 to 600 kilovolts per millimeter, and the remaining capacitor elements can withstand this potential gradient with a sufficient safety factor.

When the number of the serially connected capacitor elements is two and one element is discharged, the voltage shared by the remaining element is doubled and, therefore, the initial voltage can not be made so high. When the number is three and one element is discharged, the voltage shared by the remaining elements becomes 1.5 times the initial value and this may be within a range of practical use.

The above description relates to a phenomenon occurring during charging of the capacitor. However, when one of the capacitor elements has been discharged and the defective portion has been thereby evaporated to recover insulation, a residual voltage equal in abosolute value and opposite in polarity to the rated voltage is left in the discharged capacitor element after the terminal voltage is reduced to zero by a large current induced by the discharge operation. Most of this charge is discharged before the next charging time by internal leakage if there is a substantial time therefor.

Figure 4:
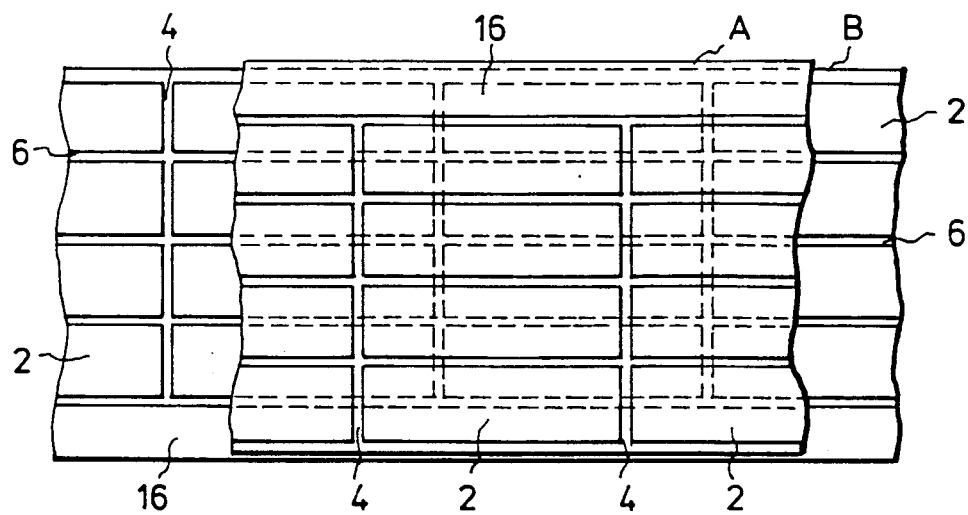
FIG. 4 is a partial plan view representing a variation of the overlapping electrode film strips of FIG. 1.

The metal electrode layers 2' lying along one side edge 8 of each dielectric film strip A or B as shown in FIG. 1 are finally connected together by the electrode terminal layer 14a or 14b. Accordingly, these electrodes 2' may be connected together on each dielectric film strip. FIG. 4 shows an alternative electrode pattern formed in accordance with this idea. In this pattern, the electrode layers 2' on each film strip are substituted with a web-like single metal layer 16 lying along one side edge of the strip. It should be understood that no substantial change is induced in the capacitor function by this pattern and that the electrical contact of the terminal layers 14a and 14b will be improved thereby.

Now, some examples of the unit capacitor constructed in accordance with this invention will be described below.

EXAMPLE 1

If the dielectric film strip is 9 micrometers thick and 380 millimeters wide and the longitudinal insulating gap 6 is 8 millimeters wide, the effective width of each capacitor element is 32.67 millimeters. If the width of the lateral insulating gap is also 8 millimeters and the interval of the gaps is 400 millimeters, the facing area of each capacitor element is $32.67 \times 392 = 12.8 \times 10^3$ square millimeters and the capacitance thereof is 0.08 microfarads. When the capacitor is charged at a voltage of 2700 volts, the cumulative energy of the capacitor element is 0.292 joule.

Figure 5:
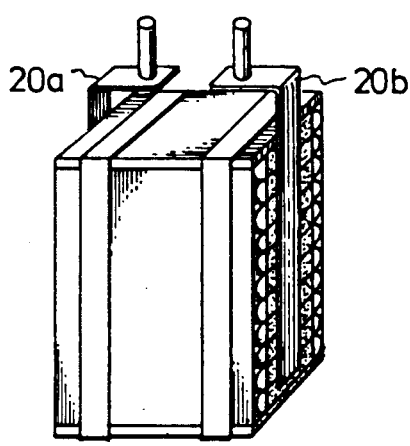
FIG. 5 is a perspective view representing an example of a capacitor bank composed of the unit capacitors as shown in FIG. 2.
Figure 6:
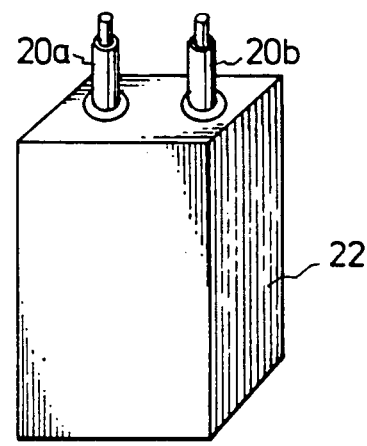
FIG. 6 is a perspective view representing a completed capacitor device containing the capacitor bank of FIG. 5.

When such overlapping electrode strips A and B of 475 meters long were wound on a cylindrical core of a diameter of 160 millimeters and then flatly pressed as shown in FIG. 2, the resultant unit capacitor was 31 millimeters thick, 283 millimeters wide and 382 millimeters long. This unit capacitor included in total 11250 capacitor elements arrayed in 9 series rows and 1250 parallel columns and exhibited a total capacitance of 11.11 microfarads and a rated voltage of 24.3 kilovolts. When 18 pieces of such unit capacitors were piled up and connected in parallel as shown in FIG. 5 (though only 11 unit capacitors are shown) by a pair of terminal members 20a and 20b and the whole structure was contained in a casing 22 as shown in FIG. 6 and impregnated in insulating oil, the size of the casing was 300 millimeters wide, 410 millimeters long and 700 millimeters high and the ratings were 200 microfarads, 24 kilovolts and 57.6 killojoules. The volume of the casing was 86.1 liters and the volume per unit joule was 1.5 milliliters. In contrast, in the prior art capacitor of 20 kilovolt, 62 microfarad and 12.5 kilovolt ratings, the casing size was 650×240×500 millimeters, the casing volume was 78 liters and the volume per unit joule was 6.24 milliliters. Accordingly, the volume of the inventive capacitor was reduced to 24 percent of that of the prior art capacitor.

EXAMPLE 2

Aluminum or zinc was evaporated in vacuum onto a polypropylene film of 8 micrometers thick and 394 millimeters wide to form an electrode layer pattern as shown in FIG. 4. The longitudinal insulating gaps 6 were 6 millimeter wide and, therefore, the effective width of each capacitor element was 36, millimeters. The lateral insulating gaps 4 were also 6 millimeters wide and had 100 millimeter intervals. Thus, the facing area of the capacitor element was 36×94=3,384 square millimeters and the capacitance thereof would be 0.0172 microfarad. If an a.c. voltage having an effective value of 367 volts should be applied thereto, its wave height would be 367×2=519 volts. Accordingly, the cumulative energy of each capacitor element would be:

$$J_c = CV^2/2 = 0.0172 \times 10^{-6} \times 519^2/2 = 0.00238 \text{ joule.}$$

Even if this energy is discharged completely, it will result in mere local breakdown and never induce complete damage of the capacitor. When part of the capacitor becomes conductive due to breakdown, a current of 2.38 milliamperes at a rated condition flows therethrough to fuse and sputter the evaporated electrode, thereby recovering insulation.

Figure 7:
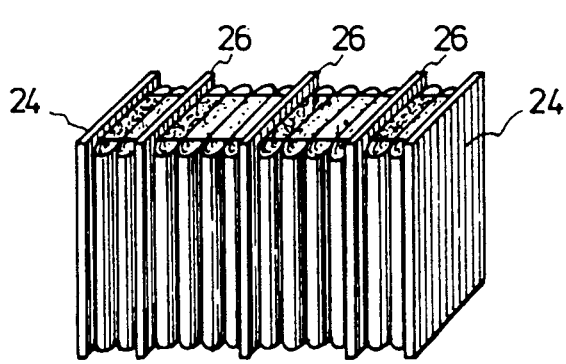
FIG. 7 is a perspective view representing another example of the capacitor bank composed of the unit capacitors as shown in FIG. 2.
Figure 8:
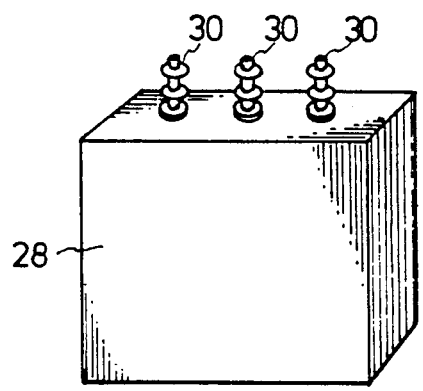
FIG. 8 is a perspective view representing a completed capacitor device containing the capacitor bank of FIG. 7.

When a pair of such electrode film strips A and B being 114 meters long were piled one upon another as shown in FIG. 4 and wound into a roll which was then crushed as shown in FIG. 2 to form a unit capacitor including about 10,000 capacitor elements. This unit capacitor was rated with 3,300 volts a.c., 2.03 microfarads and 8.34 kilovoltamperes. Twelve such unit capacitors were aggregated, as shown in FIG. 7, between a pair of tightening plates 24 and intervening three interphase insulating plates 26 to form a three phase high voltage power capacitor device rated with 60 hertz, 6,600 volts and 100 kilovoltamperes. The device was then contained in a steel casing 28 provided with terminal members 30, as shown in FIG. 8, and impregnated with a suitable insulating material such as mineral or vegetable oil, organic insulating composition, synthetic resin or insulating gas such as $SF_6$. This device also exhibited similar advantages to those of the device of Example 1 over the prior art devices.

The above description has been made for illustrative purpose only and is not intended to limit the scope of the invention. It should be obvious to those skilled in the art that various modifications and changes can be added to the abovementioned embodiments without leaving the spirit and scope of the invention as defined in the appended claims. For example, the strips A and B can be made of any suitable insulating material other than the above, which is well known in this field. The metal electrode layers 2 can also be made of any conductive material which is not only matallic but also non-metallic, and can be deposited on the strips A and B by using any suitable method, not only vacuum evaporation but also painting, printing, spraying or the like.

We claim:
1. A rolled film capacitor comprising first and second dielectric film strips which are piled one upon another and wound into a roll, each said strip having a metal layer deposited on one surface thereof, said metal layer being divided into a plurality of island electrodes which are mutually separated by a plurality of insulating gaps extending in the lateral and longitudinal directions and regularly arrayed in both said directions, said island electrodes on said strips facing each other to form a plurality of capacitor elements and shifted both laterally and longitudinally one from another in a generally overlapping fashion so as to electrically connect said capacitor elements in series in both said directions, said roll having a first end face formed with said one side edge of said first strip, a second end face formed with said one side edge of said second strip, a first electrode terminal formed on said first end face in contact with all of said island electrodes lying along said one side edge of said first strip, and a second electrode terminal formed on said second end face in contact with all of said island electrodes lying along said one side edge of said second strip.

2. A rolled film capacitor as set forth in claim 1, wherein said island electrodes lying along said one side edge of each said strip are connected to form a single continuous region, and said first and second electrode terminals are put in contact with said continuous regions on said first and second strips, respectively.

3. A rolled film capacitor as set forth in claim 1, wherein the cumulative energy of each said capacitor element is one joule or less at a rated voltage, and the potential gradient of said dielectric film is 150 killovolts per millimeter or above at a rated charging voltage.

4. A rolled film capacitor as set forth in claim 1, wherein the cumulative energy of each said capacitor element is one joule or less at a rated voltage, and the rated effective voltage of each said capacitor element is 600 volts a.c. or less.

* * * * *